United States Patent
Ozawa

(10) Patent No.: US 9,124,931 B2
(45) Date of Patent: Sep. 1, 2015

(54) MANAGING A TV APPLICATION FOR OVER-THE-TOP TV

(71) Applicant: Samsung Electronics Co., Ltd., Suwon, Gyeonggi-Do (KR)

(72) Inventor: Toshiro Ozawa, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/667,327

(22) Filed: Nov. 2, 2012

(65) Prior Publication Data

US 2014/0130081 A1 May 8, 2014

(51) Int. Cl.
*H04N 21/443* (2011.01)
*H04N 21/433* (2011.01)
*H04N 21/45* (2011.01)
*H04N 21/462* (2011.01)
*H04N 21/47* (2011.01)
*H04N 21/475* (2011.01)
*H04N 21/61* (2011.01)

(52) U.S. Cl.
CPC ......... *H04N 21/4432* (2013.01); *H04N 21/433* (2013.01); *H04N 21/4532* (2013.01); *H04N 21/4622* (2013.01); *H04N 21/47* (2013.01); *H04N 21/4751* (2013.01); *H04N 21/6125* (2013.01)

(58) Field of Classification Search
CPC ............ H04N 21/431; H04N 21/4432; H04N 21/4436; H04N 21/472; H04N 21/482
USPC ............. 725/37, 38, 105, 131, 132, 139, 140, 725/151, 152
See application file for complete search history.

(56) References Cited

U.S. PATENT DOCUMENTS

| | | | |
|---|---|---|---|
| 2010/0050219 A1* | 2/2010 | Angiolillo et al. | 725/100 |
| 2010/0253844 A1* | 10/2010 | Penic et al. | 348/554 |
| 2011/0078734 A1* | 3/2011 | Lee | 725/39 |
| 2012/0090004 A1* | 4/2012 | Jeong | 725/39 |

* cited by examiner

*Primary Examiner* — John Schnurr
(74) *Attorney, Agent, or Firm* — Sherman IP LLP; Kenneth L. Sherman; Steven Laut

(57) ABSTRACT

A method of displaying content on a TV using over-the-top (OTT) processes where the viewer has a user experience similar to or identical with conventional TV usage. The viewer powers on the TV and the last channel or service that was watched is displayed wherein all the content is displayed using OTT and the viewer does not have to execute any other steps, such as going to an app menu and launching a TV app in order to watch OTT content. It is determined whether an input source for the TV is set to a virtual input source. A TV app that enables OTT viewing (viewing TV content via an IP network) is executed. Once the TV app launches, normal TV operations can be performed. The virtual input source of the TV is linked to the TV application.

16 Claims, 4 Drawing Sheets

MANAGING A TV APPLICATION FOR OVER-THE-TOP TV

TECHNICAL FIELD

The present invention relates generally to software for televisions. More specifically, it relates to enabling viewing TV content on a television using the Internet by executing a software application.

BACKGROUND OF THE INVENTION

It is becoming increasingly prevalent for content service providers, such as TV broadcasters, cable TV companies, and the like, to provide their services, such as their TV channel lineup, over the IP network instead of using the traditional broadcast networks. When content/services are provided over the IP network, it is referred to as "over-the-top" or OTT.

Subscribers can receive the same live TV content over the IP network on smart phones, tablet devices, and Internet-connected TVs. By receiving content via OTT, subscribers may eliminate the need to use set-top boxes (STB) by viewing OTT content on TV when the TV is connected to the Internet. Using OTT is becoming a popular way to watch TV and in the future may be the standard way to watch TV (when Internet-connected TVs become more widespread). It may, over time, replace receiving a TV signal using an embedded TV turner or receiving video from an STB on one of the external input sources for the TV.

However, in order to watch OTT content, the TV viewer has to execute certain software on the TV. Another aspect of TV viewing that is becoming more popular is executing applications ("apps") on a TV in the same way users are accustomed to launching apps on their smart phones and tablets. In order to watch OTT content on a TV, the viewer has to launch an app on the TV. The app can often be bought or downloaded from an app store associated with the TV or other provider (e.g., Android Marketplace, iTunes, etc.). In some cases, this is referred to as a TV app. Once this TV app is launched from the screen on the TV that displays the various apps downloaded by the viewer, the viewer can watch TV in a normal manner.

However, having to go to the app screen on the TV after turning the TV on and then having to execute the TV app detracts from the conventional TV experience that the vast majority of viewers are used to. Viewers want to be able to turn on the TV and start watching TV shows or continuing with whatever service was on before they last powered off the TV. They do not want to take extra steps between powering on the TV and getting to the TV channel they want to watch. It would be desirable to give TV viewers a conventional or normal TV viewing experience when watching content and services via OTT.

SUMMARY OF THE INVENTION

One aspect of the invention is a method of displaying content on a TV using over-the-top (OTT) processes where the viewer has a user experience similar to or identical with conventional TV usage. The viewer powers on the TV and the last channel or service that was being used or watched is displayed where all the content is displayed using OTT and the viewer does not have to execute any other steps, such as going to an app screen and launching a TV app in order to watch OTT content. First, after the TV is powered on or another app is exited, it is determined whether an input source for the TV is set to a virtual input source. This can be done using existing TV software. If it is, viewer or subscriber credentials are checked or validated to ensure the viewer has a subscription and determine what level the subscription is. If the viewer credentials are validated, a TV app or similar app that enables OTT viewing (viewing TV content via an IP network) is executed. Once the TV app executes or launches, content from the channel or service that was last selected before the TV was powered off is displayed. For example, if the viewer was watching channel 10 before turning the TV off, channel 10 will be shown when the TV app launches. Once the TV app launches, normal TV operations can be performed. In one embodiment, the virtual input source of the TV is linked to the TV application.

Another aspect of the invention is a method of launching a TV application for over-the-top (OTT) viewing from an application menu on the TV. First, it is determined whether the TV application is being launched for the first time. If it is and has not been downloaded, the app is downloaded. The viewer credentials or registration information are then saved if the user has not previously registered. A virtual input source is then created on the TV for use by the TV application. At this stage the TV application executes and the process continues as described above.

BRIEF DESCRIPTION OF THE DRAWINGS

The invention and the advantages thereof may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF THE INVENTION

Internet-connected TVs are able to receive over-the-top (OTT) television service over an IP network using an application, referred to herein as TV app, instead of using an internal TV tuner or set-top box (STB). As described below, the TV app is a transparent application; that is, it is essentially invisible to the user (TV viewer). In various embodiments, it is launched automatically rather than through explicit steps taken by the user from a TV app menu. Through this automatic launching, users can have a familiar TV viewing experience. That is, the user first sees the same channel that was displayed when the TV was turned off and basic controls such as channel changing, volume, and the like are all available from the remote control after powering the TV on and can be done without any special operations.

The TV app used for watching OTT content on an Internet-connected TV can be selected by clicking on or selecting the TV app icon on an application menu on the TV. This is the way it is conventionally done. However, with the present invention, the TV app starts automatically in the following circumstances: when the user powers the TV on; when the input source of the TV is switched from an external input source (e.g., game console on HDMI 3 input) to a virtual input source; and when the user exits from another application on the TV.

A virtual input source is defined and is configured so that it can be selected from a TV's "input source" menu. When a user presses the "source" key on the TV remote, a list of input sources appears on the display, shown in FIG. 2. A TV may have multiple virtual input sources for multiple apps. The present invention provides a new type of auto-start application for the TV app. The TV app, described herein, directly related to displaying primary or TV content on the TV screen, will start only if certain conditions are met, as described below. Presently, there are applications that can start automatically when the TV is powered on or when another application is exited. Those apps stop when another application is started. However, these applications typically cover a small part of the TV screen (e.g., stock ticker) and do not have a direct relation to the content displayed, in contrast to the TV app.

There are also currently "bound apps" (defined by DVB-MHP and OCAP standards) which are linked to a specific TV channel or program. One of the goals of the present invention is to create a link between the TV app and a virtual input source. The TV app and the link to the virtual input source enable TV viewing service in general. This is opposed to a conventional "bound" app which is a special kind of application (e.g., Java xlet) on a TV with a link to a channel or program. A bound app starts when linked channel is selected or a linked program starts. It ends when the viewer tunes away (e.g., changes channels) from the linked channel or when the TV show ends.

Figure 1:
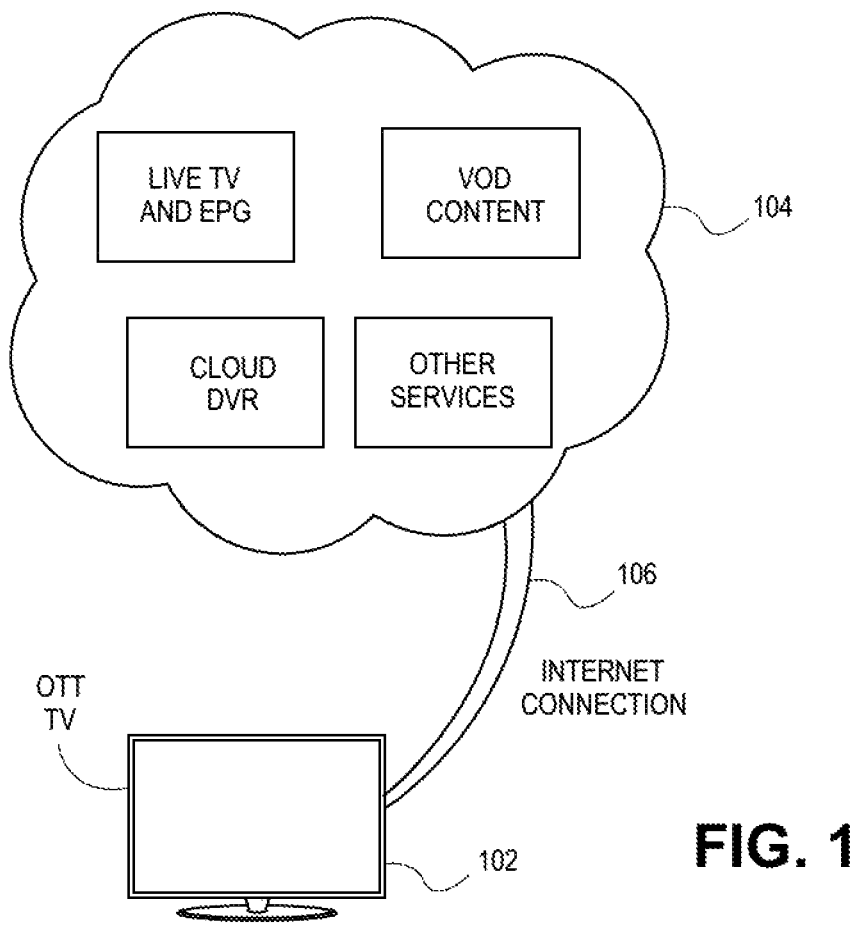
FIG. 1 is a block diagram showing a typical OTT TV in accordance with one embodiment.

FIG. 1 is a block diagram showing a conventional OTT TV in accordance with one embodiment. An OTT TV 102 is connected to the Internet and can replace a regular (non-Internet) TV that uses cable, satellite or terrestrial broadcasting. OTT TV 102 receives services 104 via an Internet connection or via a provider-specific network shown as connection 106 without the need for any other physical connection, typically coaxial cables, antennae, or satellite dish. Services 104 may consist of live TV and electronic programming guide (EPG), video-on-demand (VOD) content, content stored on DVRs/cloud, and other services and content sources. Again, these content and services can all be provided and watched on OTT TV 102 with the same user experience as watching regular TV except all the services are provided over Internet connection 106. In other embodiments, the connection to the Internet may be wireless. As described below, OTT TV 102 executes a TV app that is linked to a virtual input source that enables services 104 on TV 102.

Internet-connected TVs may have an "application framework" which allows users to run a variety of application software modules developed by third-parties (or TV manufacturer), similar to how apps run on smart phones, tablets, and PCs. An application menu screen may be displayed on a TV screen and the user can launch any application from this menu by using a remote control to select the application icon to start the application. A user can exit from an application that was launched and come back to this menu by pressing the "exit" button on the remote control, which may be a conventional TV remote control or a mobile device, such as a smart phone. The application framework may be seen as separate from regular TV functionality (e.g. watching network and cable channels). The application framework can be accessed by the user instantly upon powering on the TV. The TV app of the present invention is intended to provide OTT TV services over an IP connection and runs within the application framework. As such, the user starts the application menu and selects the TV app to start watching TV. The present invention enables the user to bypass the application menu and lets the user select the TV app in order to watch regular TV services.

Figure 2:
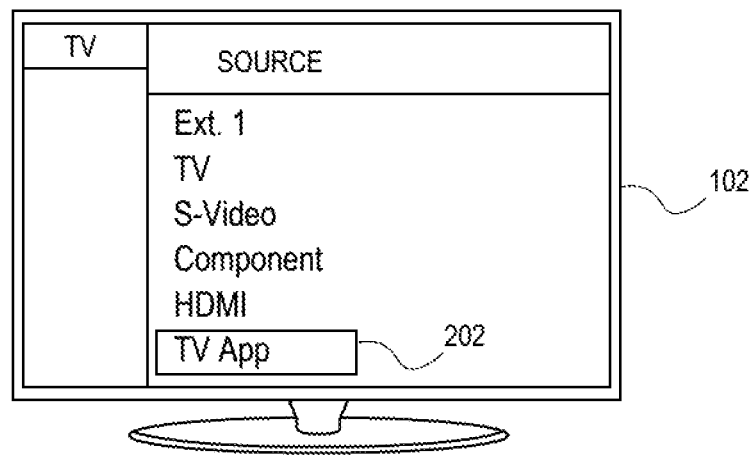
FIG. 2 a screen shot showing various inputs to OTT TV that can be configured including a TV App.

As noted above, when the user selects the "source" button for the TV, OTT TV 102 displays an input source screen. An example of this is shown in FIG. 2. Presently, TV software refers to a table of physical inputs sources (HDMI, analog video, etc.), local storage devices (e.g., a USB thumb drive or a SD card), or network-connected devices (e.g., a media server in the home network) to configure and display the list of input sources. This table is created and updated when a peripheral device is connected or disconnected so that only inputs with a connected device is selectable by the user. The table is stored in persistent memory to keep the data across power cycles. The table is also scanned when the TV is powered on so that it can recall and reconnect to the last-selected source. In the present invention, the table is also updated when an app with a virtual input source has been installed and initialized. This will create a new entry in the input source table so that the TV can recognize this virtual input as one of the selectable inputs. Once created, it is treated like any other input source. In order to make a link between the TV app and the virtual input source, the app calls a new API to add an entry to the input source table corresponding to TV app. This is done during initialization. If there are multiple such apps, each app can have its own virtual input source.

In FIG. 2 a screen is displayed showing various inputs to OTT TV 102 that can be configured, such as Ext. 1, TV, AV, S-Video, Component, HDMI, and TV App. It is the TV App input that is relevant to the present invention. There may be multiple external input sources for a TV, such as four or more HDMI inputs, external inputs, and the like. One may be "TV service" or "TV" to display content from, for example, an internal TV tuner. In FIG. 2, TV App is an input and is linked to a virtual input source; it does not have a physical input. As is known in the art, an IP connection, whether through Ethernet or Wi-Fi, cannot be defined as an input source because it is shared with other functions and applications on the TV. However, an IP connection can have a virtualized input that is linked solely to a particular application, such as the TV app of the present invention. As is known in the art, it is possible to create a virtual input source using software. As such, OTT TV 102 may have multiple virtual input sources. This virtual input source may show up as another input source in the input screen shown in FIG. 2 for the user to select. As shown in FIG. 2, TV app is highlighted indicating that it has been selected by the user. Selecting the TV app input source tells the TV software that the user wants to watch TV or watch another TV service, and not use any of the other inputs, for example, as a game console, DVD player, or other external or internal inputs.

Figure 3:
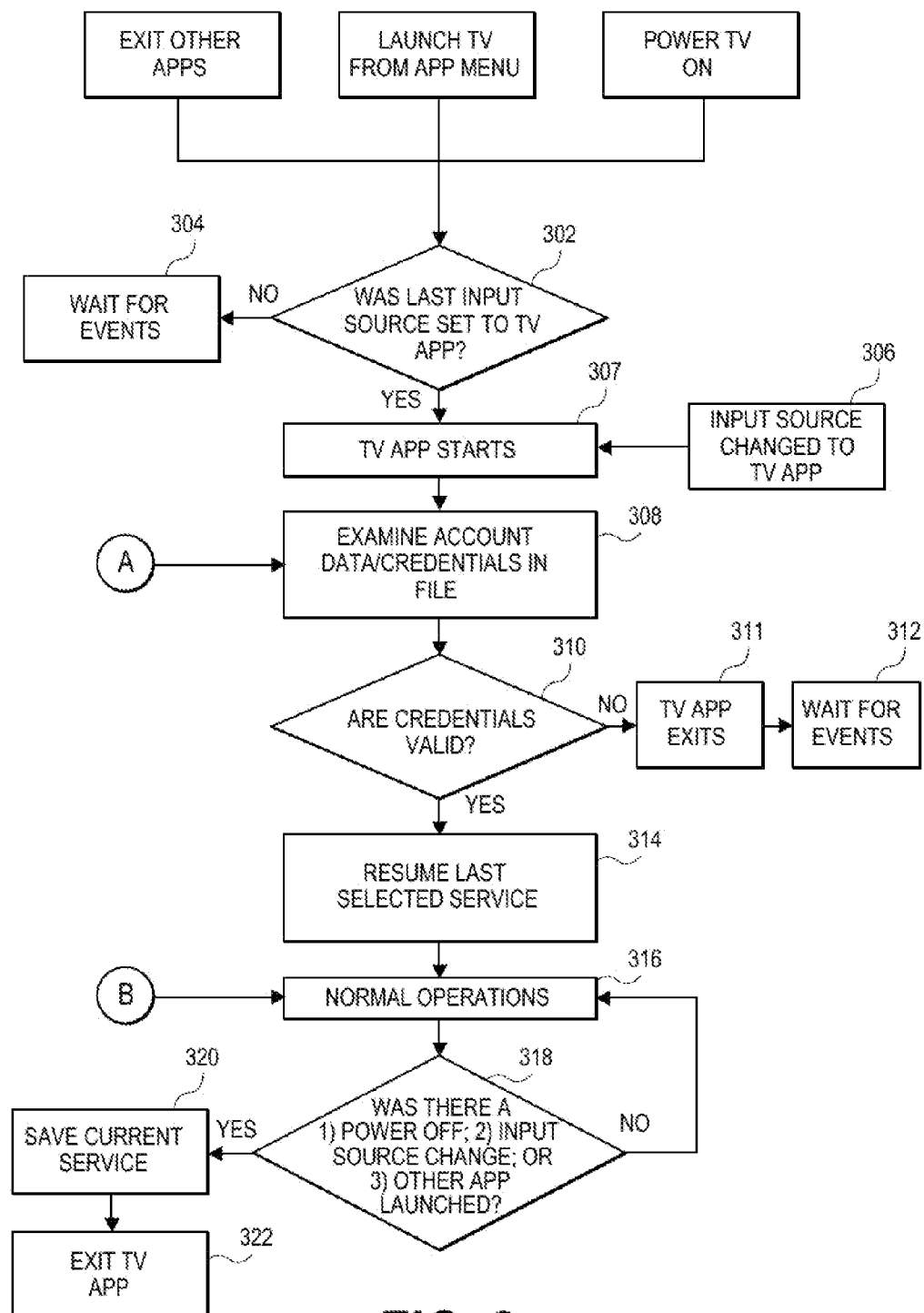
FIG. 3 is a flow diagram showing a process of watching TV and other TV services using an OTT TV upon powering on the TV or exiting other applications on the TV in accordance with one embodiment.

By introducing a virtual input source and linking it to the TV app, a user can watch TV with using the TV app and OTT in the same way the user would if he were watching regular TV; that is, by simply turning the TV on and begin watching whatever channel or service was on before the TV was turned off. FIG. 3 is a flow diagram showing a process of watching TV and other TV services using an OTT TV upon powering on the TV, upon exiting other applications on the TV, or launching a TV app from an app menu once the TV is powered on in accordance with one embodiment.

When the user turns the TV on or exits another application, the TV first determines at step 302 whether the last input source was set to the TV app which, as described above, is linked to a virtual input source. At this step the TV checks whether the input source of the TV was previously set to the TV app's virtual input. If the last input source was not set to the TV app, then at step 304 the TV waits for further actions or events from the user; that is, the TV does not do anything until it receives user input.

If the last input source was set to the TV app, control goes to step 307 where the TV app starts. Control then goes to step 308 where the TV examines user or subscriber account data on the TV to ensure the user has a subscription with the TV service provider, such as with a cable company or satellite TV provider. Control goes to step 308 if the user changes input source on the TV from one input source to the TV app. If the user goes from a game console source or a DVD player source to the TV app, as shown in step 306, then control goes to step 307 where the TV app starts. That is, the check done at step 302 is not needed if starting the TV app from another input source. If the credentials are valid thereby indicating that the user has a subscription for the service, control goes to step 314. If the user does not have the necessary credentials, control goes to step 311 where the TV app exits and to step 312 where the TV waits for the next input for the user (identical to step 304).

At step 314 the TV app resumes at the service or channel that was selected by the user before the TV was turned off, that is, the last-selected service is resumed. It is important to note that the TV app starts without the user having to select the app from an app menu screen after turning on the TV. The TV app started automatically.

At step 316 the user performs normal TV operations such as changing channels, changing volume, adjusting picture and sound quality, and the like. The user is able to use the TV in a normal and conventional manner even though the content and services to the TV are being delivered via an Internet connection, i.e., OTT. This form of delivery is essentially invisible or transparent to the user. A non-technically oriented user would not know that OTT is being used. At step 318, during normal OTT TV operations, the TV software determines whether one of three events occurs. It detects whether the user turned the TV off. It also detects whether the user changed the input source on the TV (described above), such as changing the source to EXT 1 or HDMI 1 to activate a game console or a DVD player, in effect leaving the TV app (linked to a virtual input source). It also detects whether another app was launched by the user (or automatically by the TV), thereby terminating the TV app.

If none of these events occur, then the user is simply continuing to watch TV services and the TV continues normal operations as indicated by step 316. If one of these three events occurs, before the TV app is terminated by the TV, the current service on the TV is saved at step 320. The TV then exits the TV app at step 322 and either powers off, changes input source, or launches another app.

Figure 4:
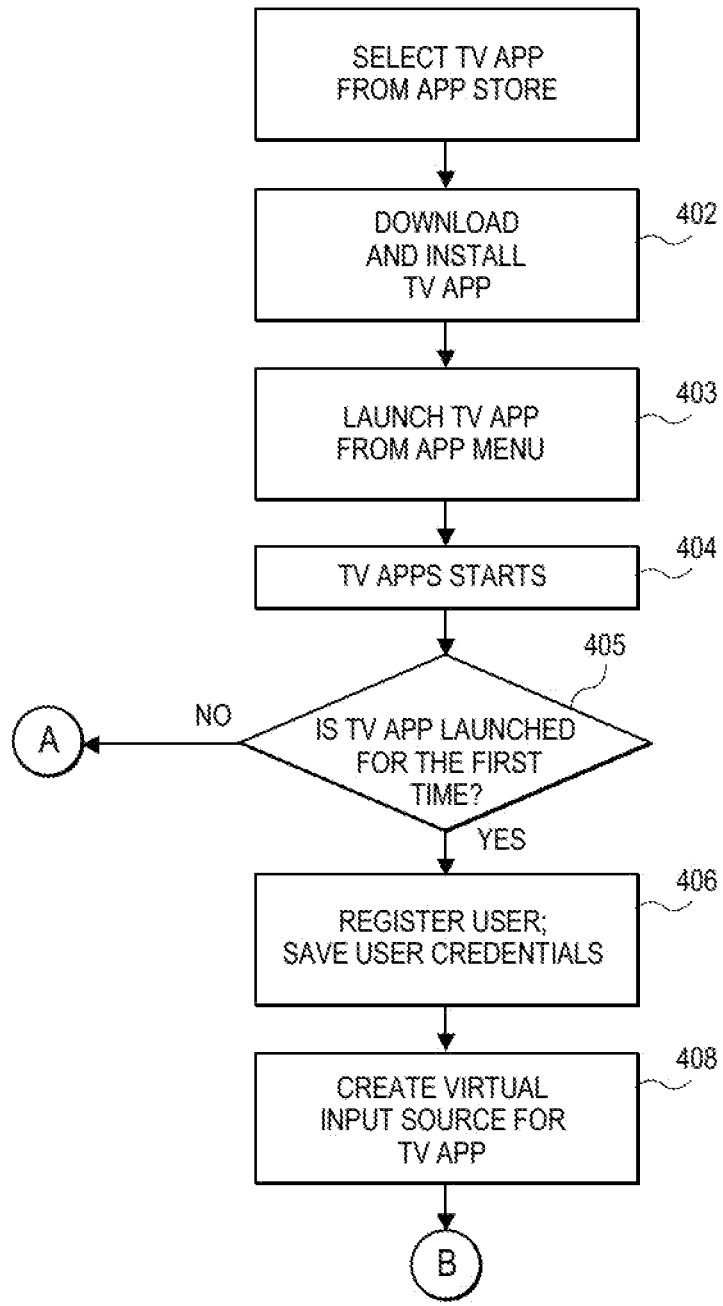
FIG. 4 is a flow diagram of a process of launching a TV app from an app menu on the TV after the TV is already powered on in accordance with one embodiment.

FIG. 4 is a flow diagram of a process that occurs once a user selects a TV app from the app store or menu on an OTT TV after the TV is already powered as shown in step 401 in accordance with one embodiment. At step 402, if the TV app is not already on the TV, it is downloaded and installed from a remote app server or other source. This is typically done by the user. The TV app is then launched from the app menu by the user at step 403. At step 404 the TV app starts or executes. At step 405, the TV checks whether the TV app is being launched for the first time on the TV. As is known in the art, there is software on the TV associated with the application framework that can perform this type of check. If the TV app has been launched on the TV before, control goes to step 308 of FIG. 3 where subscriber account data and credentials are verified. From there the process continues with step 310 where the TV checks whether the credentials are valid and the rest of the steps in FIG. 3 follow.

If the TV app is being launched for the first time, control goes to step 406 where the user is registered and user credentials and account information are saved. At step 408 the TV creates a virtual input source and links it to the TV app. Methods for linking a virtual input source to an app on the TV such as using a particular API are known in the art and described above. Once the virtual input source has been linked to the TV app at step 408 the user is able to view TV services on the TV via OTT. From step 408 control goes to step 316 of FIG. 3 where the TV operates in a normal manner. Normal operations continue (i.e., the user watches TV and uses conventional TV functions) until one of the three events described in step 318 occur.

Figure 5A:
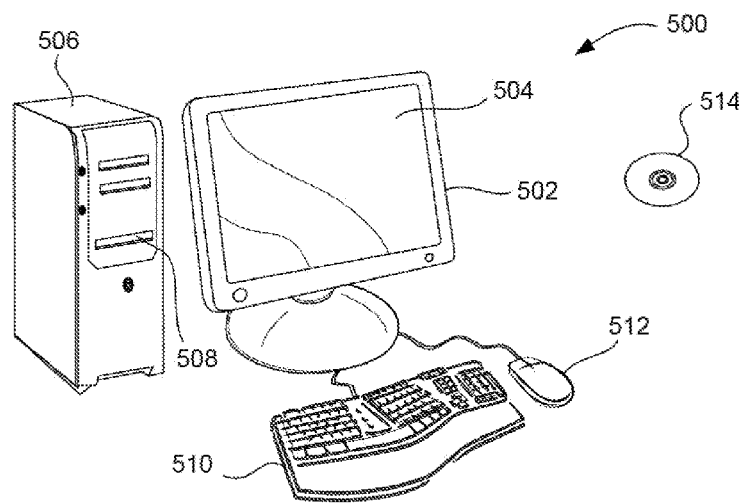
FIGS. 5A and 5B are diagrams of a computing device suitable for implementing embodiments of the present invention.
Figure 5B:
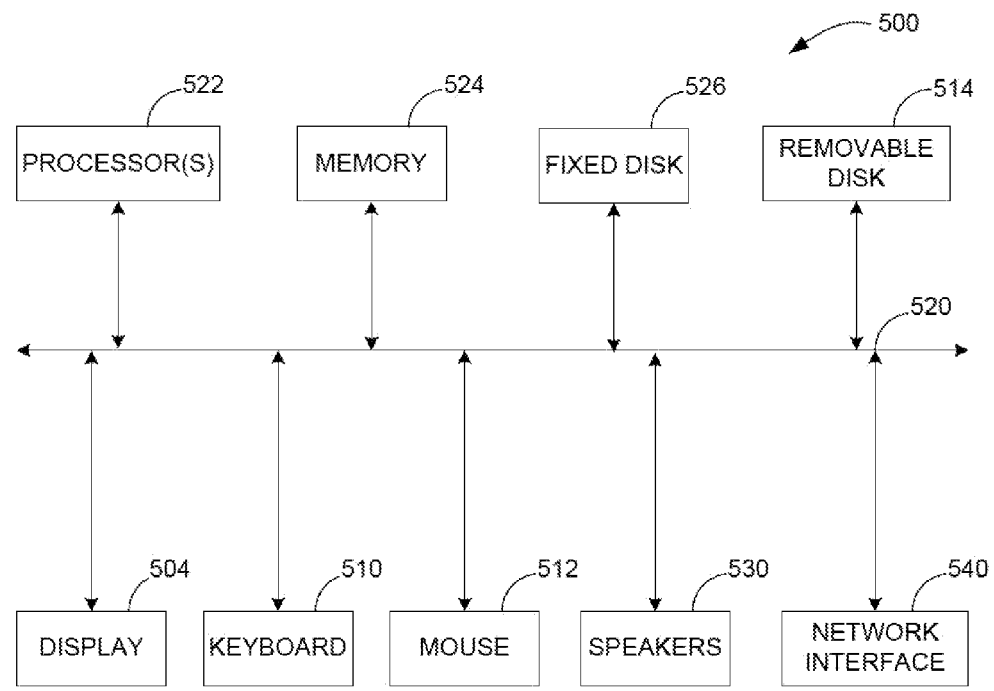

As noted above, the primary computing device in the invention is a TV, but it may be another computing device such as a smart phone, a tablet computer, a mobile device, a PC, and the like. FIGS. 5A and 5B illustrate a generic computing system 500, such as a TV, suitable for implementing specific embodiments of the present invention. Some of the devices that can be used in the present invention may have other features or components (such as an internal TV turner or an external STB) that are not shown in FIGS. 5A and 5B and not all the components shown in these figures (e.g., the keyboard) are needed for implementing the present invention. As such, FIG. 5A shows one possible physical implementation of a computing system as this term is broadly defined.

In one embodiment, system 500 includes a display or screen 504. This display may be in the same housing as system 500. It may also have a keyboard 510 that is shown on display 504 (i.e., a virtual keyboard) or may be a physical component that is part of the device housing. It may have various ports such as HDMI or USB ports (not shown). Computer-readable media that may be coupled to device 500 may include USB memory devices and various types of memory chips, sticks, and cards.

FIG. 5B is an example of a block diagram for computing system 500. Attached to system bus 520 is a variety of subsystems. Processor(s) 522 are coupled to storage devices including memory 524. Memory 524 may include random access memory (RAM) and read-only memory (ROM). As is well known in the art, ROM acts to transfer data and instructions uni-directionally to the CPU and RAM are used typically to transfer data and instructions in a bi-directional manner. Both of these types of memories may include any suitable of the computer-readable media described below. A fixed disk 526 is also coupled bi-directionally to processor 522; it provides additional data storage capacity and may also include any of the computer-readable media described below. Fixed disk 526 may be used to store programs, data and the like and is typically a secondary storage medium that is slower than primary storage. It will be appreciated that the information retained within fixed disk 526, may, in appropriate cases, be incorporated in standard fashion as virtual memory in memory 524.

Processor 522 is also coupled to a variety of input/output devices such as display 504 and network interface 540. In general, an input/output device may be any of: video displays, keyboards, microphones, touch-sensitive displays, tablets, styluses, voice or handwriting recognizers, biometrics readers, or other devices. Processor 522 optionally may be coupled to another computer or telecommunications network using network interface 540. With such a network interface, it is contemplated that the CPU might receive information from the network, or might output information to the network in the course of performing the above-described method steps. Furthermore, method embodiments of the present invention may execute solely upon processor 522 or may execute over a network such as the Internet in conjunction with a remote processor that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are illustrative and not restrictive, and the invention is not to be limited to the details given herein, but may be modified within the scope and equivalents of the appended claims.

What I claim is:

1. A method of displaying content on a television (TV), the method comprising:
    dynamically determining, by a determining function, whether an input source for the TV is set to a virtual input source;
    validating viewer account credentials;
    executing a TV application that enables over-the-top (OTT) TV video content delivery using an Internet connection;
    dynamically displaying content from a last-selected channel or service for providing OTT TV video content delivery on the TV by the TV application in response to executing the TV application, powering on the TV, and exiting another application on the TV;
    enabling normal TV operations including at least changing channels; and
    upon powering on the TV, for the last input source for the TV set to the TV application, automatically executing the TV application that enables the OTT TV video content delivery for the last-selected channel or service.

2. The method of claim 1, further comprising:
    linking the virtual input source to the TV application which does not have a physical input to the TV.

3. The method of claim 1, further comprising:
    dynamically exiting a different application on the TV, by the TV application, before determining whether an input source for the TV is set to a virtual input source;
    wherein the determination function comprises a TV function.

4. The method of claim 1, further comprising:
    determining if the last input source for the TV was set to the TV application.

5. The method of claim 4, further comprising:
    automatically detecting, by the TV application, a change in the input source to the TV application.

6. The method of claim 1, further comprising:
    automatically resuming the last selected service or channel in response to executing the TV application, when OTT on the TV is enabled.

7. The method of claim 1, further comprising:
    terminating the TV application and performing clean-up before the TV powers off.

8. The method of claim 1, further comprising:
    automatically detecting, by the TV application, a TV power off, a change of input source, or launching a different application;
    saving a current service or channel provided via OTT based on the detecting for use as the last-selected service or channel; and
    exiting the TV application.

9. The method of claim 8, further comprising:
    dynamically saving, using the TV application, the current service provided via OTT as an input source based on the detecting in a table that also stores physical input sources; and
    automatically scanning the table using the TV application upon the TV powering on for recalling and reconnecting to the last-selected input source.

10. The method of claim 1, wherein the last-selected service is a TV channel or a video-on-demand.

11. The method of claim 1, wherein the TV automatically executes the TV application and displays the OTT TV video content, using the TV application, from the last-selected service or channel on the TV without user interaction.

12. The method of claim 1, wherein
    automatically executing the TV application that enables the OTT TV video content delivery comprises using the Internet connection upon powering on the TV, and OTT TV video content from the last-selected service or last selected channel from the virtual input source on the TV is automatically displayed by the TV application.

13. The method of claim 1, further comprising:
    automatically executing the TV application that enables the OTT TV video content delivery using the Internet connection upon the input source switching from an external input source to the virtual input source, wherein OTT TV video content from the last-selected service or last selected channel on the TV from the virtual input source is automatically displayed by the TV application.

14. The method of claim 1, wherein the TV application receives the OTT TV video content delivery using the Internet connection instead of an internal TV tuner or set-top-box (STB).

15. A television (TV) displaying over-the-top (OTT) content, the TV comprising:
    means for dynamically determining, by a determination function, whether an input source for the TV is set to a virtual input source by scanning a table of input sources;
    means for validating viewer account credentials;
    means for executing a TV application wherein the TV application enables OTT TV video content delivery using an Internet connection;
    a display component for dynamically displaying OTT TV video content from a last-selected service or channel for providing OTT TV video content delivery on the TV by the TV application in response to one or more of executing the TV application, powering on the TV, and exiting another application on the TV; and means for enabling normal TV operations including at least changing channels, wherein upon powering on the TV, for the last input source for the TV set to the TV application, the TV automatically executing the TV application for the last-selected channel or service and displaying the OTT TV video content on the TV.

16. The TV of claim 15, further comprising:

means for linking the virtual input source to the TV application which does not have a physical input to the TV.

* * * * *